United States Patent Office 2,941,992
Patented June 21, 1960

2,941,992

WATER-INSOLUBLE AZO DYESTUFFS

Paul Rhyner and Hugo Illy, Basel, Switzerland, assignors to Ciba Limited, Basel, Switzerland, a Swiss firm No Drawing. Filed Sept. 29, 1958, Ser. No. 763,826

Claims priority, application Switzerland Oct. 11, 1957

1 Claim. (Cl. 260—205)

The present invention provides valuable new azo-dyestuffs which are free from acid groups imparting solubility in water and correspond to the general formula $$A\text{---}N\text{=}N\text{---}B$$

in which A represents a benzene radical of the formula

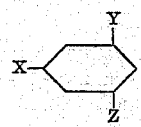

in which X represents a hydrogen or halogen atom or a nitro, cyano, alkyl-sulfone, sulfonamide or carbalkoxy group, Y represents a hydrogen or halogen atom or an alkyl, alkoxy, nitro, cyano, alkyl-sulfone, sulfonamide or carbalkoxy group, Z has one of the meanings given for Y when X is a hydrogen or halogen atom or a cyano, alkyl-sulfone or sulfonamide group, and Z represents an alkyl, alkoxy, nitro, cyano, alkyl-sulfone, sulfonamide or carbalkoxy group when X is a nitro group, and B represents the radical of an N:N-di-cyanoethyl-aniline bound to the azo linkage in para-position to the amino group.

The invention also provides a process for the manufacture of the above dyestuffs, where in a diazo-compound of an amine of the formula

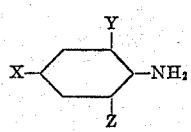

in which X, Y and Z have the meanings given above, is coupled with an N:N-dicyanoethyl-aniline capable of coupling in para-position to the amino group, the diazo- and coupling components used being free from acid groups imparting solubility in water.

As examples of suitable diazo-components may be mentioned the following amines:

1-amino-4-methylbenzene,
1-amino-4-chlorobenzene,
1-amino-4-bromobenzene,
1-amino-4-methylsulfonylbenzene,
1-amino-benzene-4-carboxylic acid methyl ester,
1-amino-benzene-4-chloromethylsulfone,
1-amino-benzene-4-cyanoethylsulfone,
1-amino-2:4-dichlorobenzene,
1-amino-2-methyl-4-chlorobenzene,
1-amino-2-trifluoromethyl-4-chlorobenzene,
1-amino-4-chloro-2-methylsulfonylbenzene,
1-amino-2-chloro-4-methylsulfonylbenzene,
1-amino-2-chloro-4-chloromethylsulfonylbenzene,
1-amino-2-chloro-4-cyanoethylsulfonylbenzene,
1-amino-2:4-bis(methylsulfonyl)-benzene,
1-amino-2:6-dibromo-4-methylsulfonylbenzene,
1-amino-2-methyl-4-nitrobenzene,
1-amino-2-methoxy-4-nitrobenzene,
1-amino-2-trifluoromethyl-4-nitrobenzene,
1-amino-2-methylsulfonyl-4-nitrobenzene,
1-amino-2-chloromethylsulfonyl-4-nitrobenzene,
1-amino-2-cyanoethylsulfonyl-4-nitrobenzene,
1-amino-2:4-dinitrobenzene,
1-amino-2:4-dinitro-6-chlorobenzene,
1-amino-2:4-dinitro-6-bromobenzene.

Of special interest are aminobenzenes that contain at least one cyano group bound to the benzene nucleus such, for example, as 1-amino-4-cyanobenzene,
1-amino-2-chloro-4-cyanobenzene,
1-amino-2-cyano-4-chlorobenzene,
1-amino-2:4-dicyanobenzene,
1-amino-2-cyano-4-methylsulfonylbenzene,
1-amino-4-cyano-2-methylsulfonylbenzene,
1-amino-2-cyano-4-nitrobenzene.

Advantageous coupling components are amines of the formula

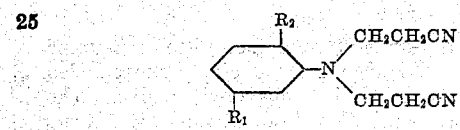

in which $R_1$ represents a hydrogen or halogen atom or an alkyl, alkoxy or aliphatic acylamino group, and $R_2$ represents a hydrogen atom or an alkyl or alkoxy group.

Examples of suitable coupling components are:

N-bis-cyanoethyl aniline,
1-(N-bis-cyanoethyl)-amino-3-methylbenzene,
1-(N-bis-cyanoethyl)-amino-3-methoxybenzene,
1-(N-bis-cyanoethyl)-amino-3-acetylaminobenzene,
1-(N-bis-cyanoethyl)-amino-3-chlorobenzene,
1-(N-bis-cyanoethyl)-amino-2:5-dimethylbenzene,
1-(N-bis-cyanoethyl)-amino-2-methoxy-5-methylbenzene.

The aforesaid coupling components are either known compounds or can be made by methods in themselves known, for example, by reacting an appropriate bis-chlorethyl compound with an alkali metal cyanide (J. Chem. Soc. 1934, page 1536), or by reacting an appropriate aniline with acrylonitrile.

The amines to be used as diazo-components can be diazotised by methods in themselves known, for example, with the aid of a mineral acid, more especially hydrochloric acid, and sodium nitrite, or with a solution of nitrosyl-sulfuric acid in concentrated sulfuric acid.

The coupling can also be carried out by a method in itself known, for example, in a neutral to acid medium, if desired in the presence of sodium acetate or a similar buffer substance capable of regulating the speed of coupling or of a catalyst such as pyridine, or a salt thereof.

After the coupling reaction the dyestuffs formed can easily be separated from the coupling mixture, for example, by filtration, since they are substantially insoluble in water.

The monoazo-dyestuffs of this invention are excellently suitable for dyeing or printing structures, for example, made from polyamides, and more especially of fibers of cellulose acetate rayon, of cellulose triacetate and of polyethylene terephthalate.

The dyeings produced with the new dyestuffs on the aforesaid structures are distinguished by their pure, vivid tints and by their good general properties of fastness, above all by their good fastness to sublimation and light, The following examples illustrate the invention, the parts and percentages being by weight:

Example 1

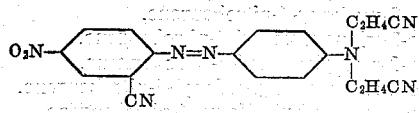

16.3 parts of 1-amino-2-cyano-4-nitrobenzene are introduced in portions into a solution of 6.9 parts of sodium nitrite in 60 parts of concentrated sulfuric acid.

Upon pouring the mixture on to 400 parts of ice, a clear yellow solution is obtained. This diazo-solution is run into a solution of 19.9 parts of N:N-bis-(cyanoethyl)-aniline in 100 parts of concentrated hydrochloric acid. By the addition of a saturated solution of sodium acetate the dyestuff is precipitated as a brownish red powder which dyes cellulose acetate rayon, nylon, cellulose triacetate and polyester fibers pure red tints. The dyeings on polyester fibers are distinguished by their very good fastness to light and sublimation.

Example 2

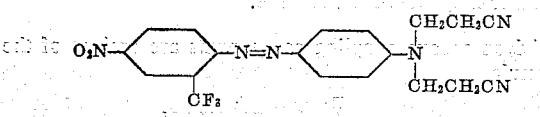

20.6 parts of 1-amino-trifluoromethyl-4-nitrobenzene are diazotised as described in Example 1, and coupled with 19.9 parts of N:N-bis-(cyanoethyl)-aniline. The dyestuff separates as a dark red powder, and dyes fibers of cellulose acetate rayon, nylon, cellulose triacetate and polyesters red tints having the same properties as the dyestuff of Example 1.

Example 3

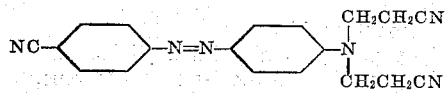

11.8 parts of 1-amino-4-cyanobenzene are dissolved in 200 parts of 2 n-hydrochloric acid, cooled with ice to 0° to 5° C. and 25 parts of 4 n-sodium nitrite solution are added. The coupling is carried out as described in Example 1.

The dyestuff dyes cellulose acetate, polyamide, cellulose triacetate and polyester fibers pure yellow tints. The dyeings on polyester fibers are distinguished by their good fastness to light and sublimation.

By diazotising amines named in column 1 of the following table, as described in the foregoing examples, and coupling the diazo-compounds with the coupling component named in column II, dyestuffs are obtained that dyed cellulose acetate rayon, polyamide, cellulose triacetate and polyester fibers the tints given in column III.

| I<br>Diazo component | II<br>Coupling component | III<br>Tint |
|---|---|---|
| 1. 1-amino-4-chlorobenzene | Bis-(cyanoethyl)-aniline | pale yellow. |
| 2. 1-amino-2:4-dichlorobenzene | ___do___ | golden yellow. |
| 3. 1-amino-2-trifluoromethyl-4-chlorobenzene. | ___do___ | yellow. |
| 4. 1-amino-2-cyano-6-chloro-4-nitrobenzene. | ___do___ | bluish red. |
| 5. 1-amino-2-methyl-4-nitrobenzene. | ___do___ | orange. |
| 6. 1-amino-2-methoxy-4-nitrobenzene. | ___do___ | Do. |
| 7. 1-amino-2-trifluoromethyl-4-nitrobenzene. | ___do___ | red. |
| 8. 2-amino-5-nitro-benzoic acid methyl ester. | ___do___ | Do. |
| 9. 1-amino-2-methylsulfone-4-nitrobenzene. | ___do___ | Do. |
| 10. 1-aminobenzene-4-methylsulfone. | ___do___ | yellow. |
| 11. 1-aminobenzene-4-chloromethylsulfone. | ___do___ | golden yellow. |
| 12. 1-aminobenzene-4-β-cyanomethylsulfone. | ___do___ | yellow. |

By using, instead of the coupling component named in column II, 1-di-(cyanoethyl)-amino-3-methylbenzene or 1 - di - (cyanoethyl) - amino - 3 - methyl - 6 - methoxybenzene, similar dyestuffs result.

Example 4

1 gram of the dyestuff obtained as described in Example 1 is pasted with 1.5 grams of sulfite cellulose waste liquor or dinaphthylmethane disulfonic acid or a condensation product of a fatty alcohol with ethylene oxide, then diluted with water to 4000 cc., and there are added, per liter, 1 cc. of acetic acid of 40% strength and 1 gram of a condensation product of a fatty alcohol with ethylene oxide. 100 grams of a yarn of polyester fibers is dyed in the resulting dyebath for ½ to 1 hour at 115° to 132° C. A deep red dyeing of very good fastness to light and sublimation is obtained.

What is claimed is:

The azo-dyestuff of the formula

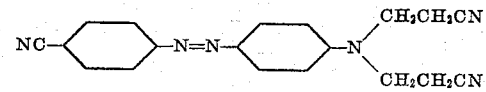

References Cited in the file of this patent

UNITED STATES PATENTS

| 2,156,446 | Bock | May 2, 1939 |
| 2,173,417 | Huber | Sept. 19, 1939 |
| 2,782,187 | Sartori | Feb. 19, 1957 |